May 1, 1934. J. B. ARMITAGE 1,957,310
MACHINE TOOL TRANSMISSION AND CONTROL
Filed July 8, 1933 5 Sheets-Sheet 1

INVENTOR
Joseph B Armitage
BY
Fred A Parsons
ATTORNEY

May 1, 1934.                J. B. ARMITAGE                1,957,310
                  MACHINE TOOL TRANSMISSION AND CONTROL
                    Filed July 8, 1933      5 Sheets-Sheet 2

INVENTOR
Joseph B Armitage
BY
Fred G Parsons
ATTORNEY

May 1, 1934.　　　　　J. B. ARMITAGE　　　　　1,957,310
MACHINE TOOL TRANSMISSION AND CONTROL
Filed July 8, 1933　　　5 Sheets-Sheet 5
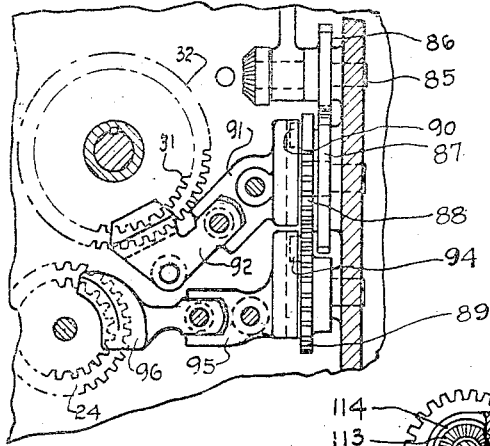
Fig. 6.
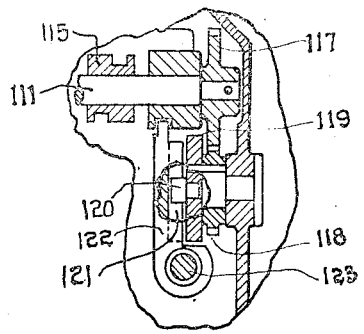
Fig. 9
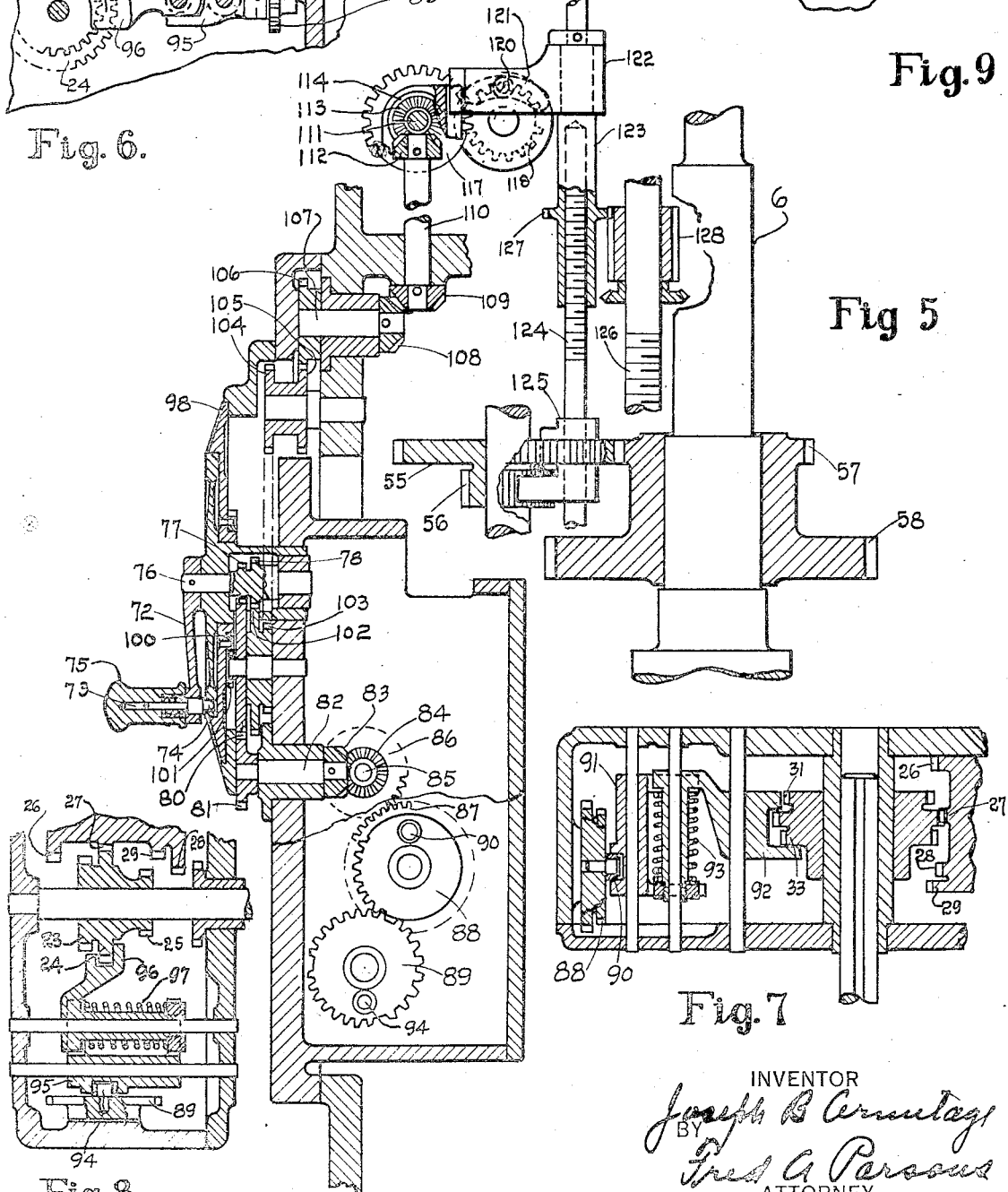
Fig. 5
Fig. 7
Fig. 8.
INVENTOR
Joseph B Armitage
BY
Fred A Parsons
ATTORNEY Patented May 1, 1934

1,957,310

UNITED STATES PATENT OFFICE 1,957,310

MACHINE TOOL TRANSMISSION AND CONTROL

Joseph B. Armitage, Wauwatosa, Wis., assignor to Kearney & Trecker Corporation, West Allis, Wis.

Application July 8, 1933, Serial No. 679,516

9 Claims. (Cl. 90—19)

This invention relates to transmission and control mechanism for machine tools, and more particularly for milling machines.

An object of the invention is to provide improved, single lever shifting means for a multi-speed rate changer, in a form adapted for milling machines and particularly for knee type milling machines of the vertical spindle form.

A further object is to provide an improved transmission and control for the spindle of vertical spindle milling machines, particularly where the vertical spindle is bodily movable in the direction of its axis, with respect to the table of the machine.

A further object is to provide an improved multi-speed power train for driving the vertical spindle.

A further purpose is to provide an improved bearing support for the vertical spindle, and with particular consideration for rigidity of the spindle mounting and of the driving train.

A further purpose is to provide a spindle rate changer having a wide range of rates with relatively small increments of rate change, and to provide an improved device for selecting the desired spindle rate.

A further purpose is to generally simplify and improve the construction and operation of machine tools, particularly of milling machines; and still other purposes and objects will be apparent from the specification.

The invention consists in the structure herein disclosed and claimed, and in such modification of the specific structure shown as is equivalent to the claims.

In the drawings like reference characters have been used to indicate the same parts in each of the views.

Fig. 5 is a development of portions of a spindle train rate change control device.

Figs. 6, 7, 8, 9, 10 show portions of said rate change control device.

Figure 1:
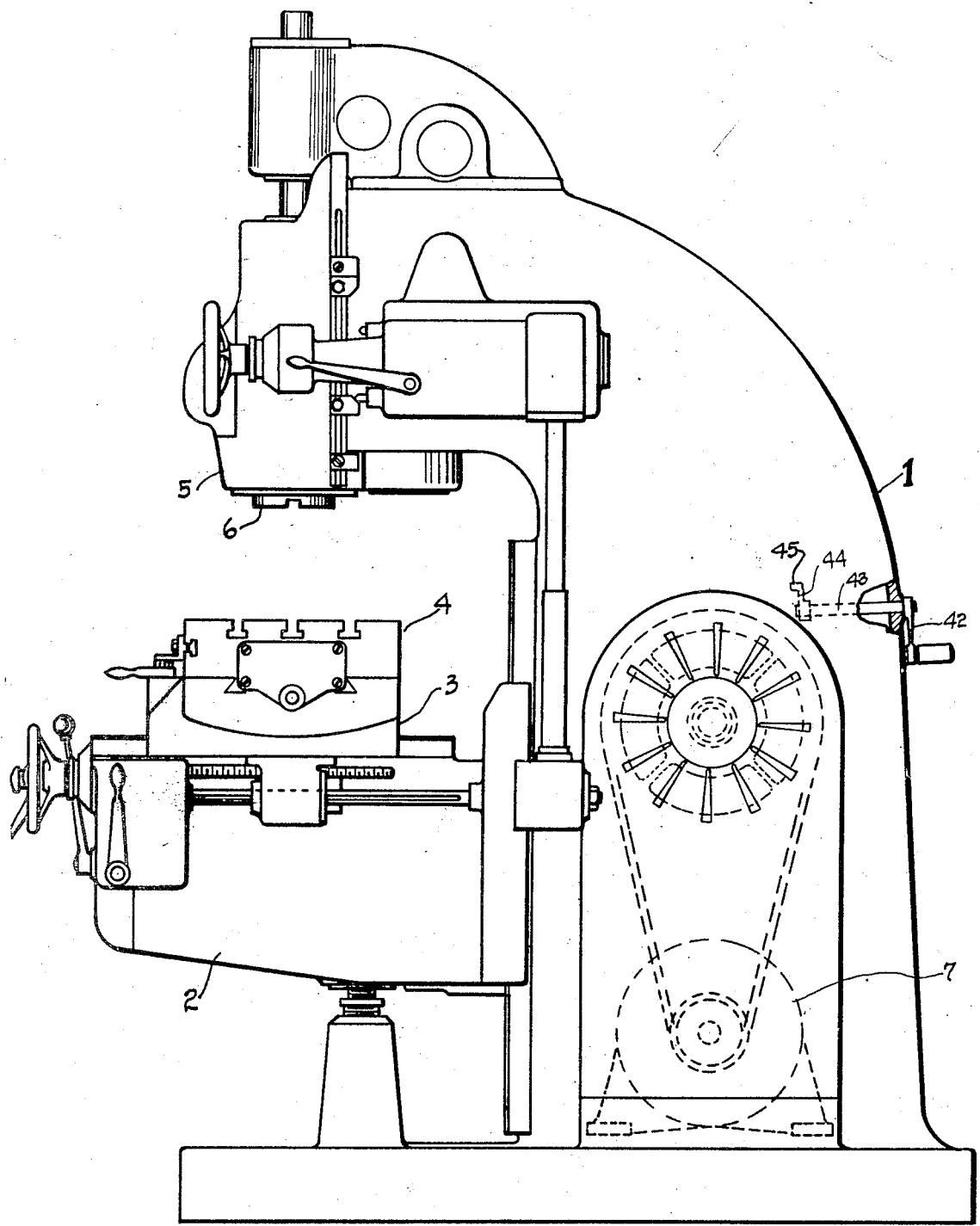
Fig. 1 is a right-hand view of a knee and column type vertical spindle milling machine which incorporates the invention.

The machine includes a column or main support 1, a knee or support 2 slidably guided on the column for vertical movement, a saddle or support 3 slidably guided on the knee for cross movement, and a table or work support 4 slidably guided on the saddle for longitudinal movement. The several supports together provide for bodily movement of table 4 in three mutually transverse reciprocatory paths or courses.

A spindle carrier or support 5 is slidably guided on column 1 for vertical movement above the table 4 and rotatably mounted in the carrier 5 is a tool spindle or support 6 which is bodily movable with the carrier.

A power source, consisting of a motor 7, is housed within column 1 and drives a pulley 8 through a motor pulley 9 and a multi-strand belt 10. Pulley 8 is fixed with a sleeve 11 upon which is fixed a gear 12 which forms the primary member of a branch line or lines for driving any mechanism which should be continuously operative whenever the motor 7 is running, such, for instance, as the quick traverse drive train for the table and other supports. Also fixed in sleeve 11 is a clutch member 13 of a main clutch generally denoted by the numeral 14. Member 13 is adapted for engagement by a complementary clutch member 15 slidably keyed on a shaft 16, and member 15 may be shifted into and out of engagement by suitable means, such, for instance, as the manually operable lever 17 having a suitable motion transmitting connection with a pivoted shifter fork 18 carrying shoes 19 engaging an annular groove 20 in the clutch member. Axially coinciding with shaft 16 and keyed therewith is a shaft 21 with which is fixed a gear 22, which forms the primary member of a branch line or lines intended to be operative only when the main clutch 14 is engaged, such, for instance, as a feed train for the movement of the various supports.

The knee 2, saddle 3 and table 4 of the machine are intended to be manually movable and also power movable from the primary quick traverse and feed elements 12 and 22. For this purpose any suitable trains and controls may be used, such, for instance, as those shown in my copending application, Serial No. 586,561, filed January 14, 1932. The spindle carrier is likewise intended to be both manually movable and power movable from the primary elements 12 and 22 by the means of suitable mechanism, such, for instance, as that shown in my copending application Serial No. 618,660, filed June 22, 1932, or my copending application, Serial No. 627,412, filed August 4, 1932.

Figure 2:
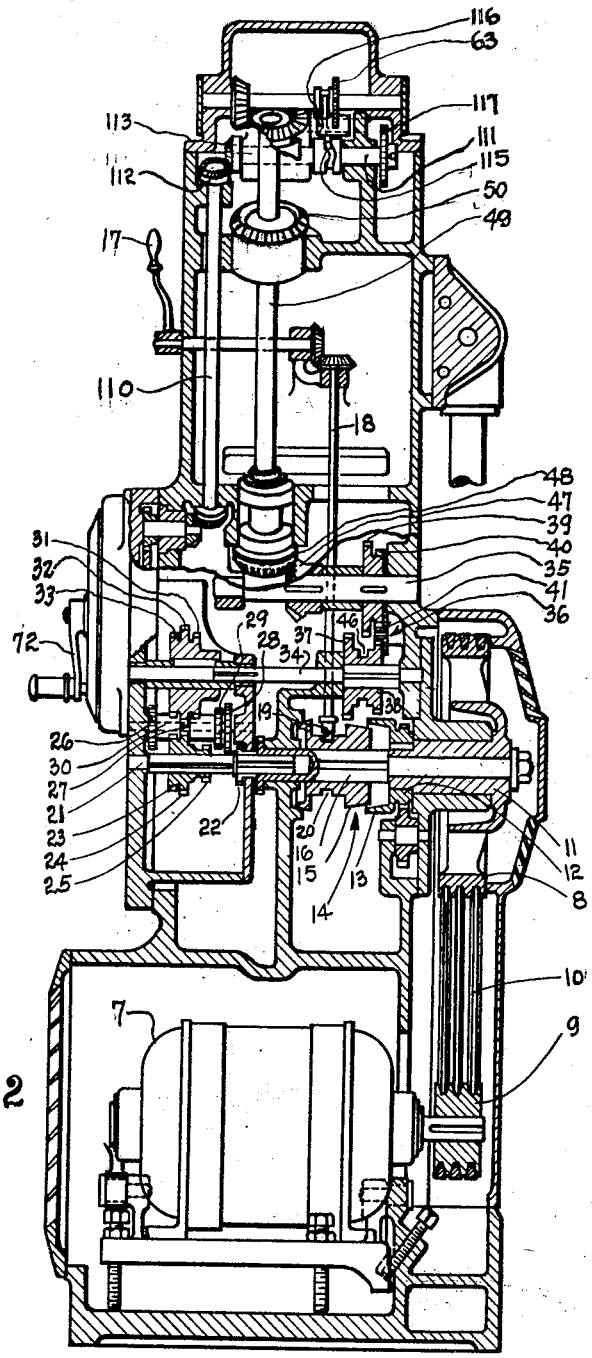
Fig. 2 is an approximately vertical section through the column of the same machine, viewed from the front.

The spindle 6 is driven from shaft 21 through a transmission train which includes both rate change means and reversing means, as follows: Slidably keyed on shaft 21, Fig. 2, are three gears 23, 24, 25 fixed together to be engageable one at a time respectively with the gears 26, 27, 28 which together with a gear 29 are fixed together to rotate on a stud 30. The gears 26, 27, 29 are engageable one at a time respectively by the gears 31, 32, 33 fixed together and slidably keyed on a shaft 34. The mechanism just described constitutes a first rate change means having relatively small rate change increments and providing a total of nine rate changes. Shaft 34 drives a shaft 35 through a reverser generally denoted by the numeral 36, Fig. 2, and which includes a pair of gears 37, 38 fixed together and slidably keyed on shaft 34, a pair of gears 39, 40 fixed on shaft 35 and an intermediate gear 41 permanently meshed with the gear 40. The gears 37, 38 are alternatively engageable respectively with the gears 39 and 41 whereby to reverse shaft 35 and the remainder of the spindle train. Any suitable mechanism may be used for shifting the gear pair 37, 38, such, for instance, as the hand lever 42, Fig. 1, which may be connected to the gear pair by the means of a shaft 43 and a lever 44 having a lug 45 engaging an annular groove 46, Fig. 2, in the hub of the gear pair.

Shaft 35 drives spindle 6 through a second rate change means as follows: Fixed on shaft 35 is a bevel gear 47, engaging a bevel gear 48 fixed on an angularly disposed semi-vertical shaft 49. At an intermediate point on shaft 49 there is fixed a bevel gear 50, Fig. 3, meshing with a bevel gear 51 with which is fixed a gear 52 meshed with a gear 53. Slidably splined in the axial bore of gear 53 is a vertical shaft 54 which is journaled in and bodily movable with spindle carrier 5, and within the housing formed by the walls of the spindle carrier the shaft 54 carries the gears 55 and 56 fixed together and slidably splined for alternative engagement, respectively, with the gears 57, 58 fixed on spindle 6 and also within the carrier housing. Another gear, namely, worm 59 on the spindle 6, is slidably splined therewith to permit the spindle to move axially with the carrier, gear 59 being axially fixed with the column 1. Gear 59 may be driven from shaft 49 through a bevel gear 60, Figs. 3, 4, fixed on shaft 49 and meshing with a bevel gear 61 fixed on a shaft 62, upon which is slidably keyed a gear 63, to be alternatively engaged or disengaged with a gear 64 fixed with a worm gear 65 which is permanently meshed with the worm 59, the gears 65, 59 being of a tooth form and angle such that either one may drive the other with a high degree of efficiency.

The second rate change means just described provides three changes of rate between the shaft 49 and the spindle 6, of relatively large increments of rate change, which, together with the nine changes effected in the first rate change means previously described, provides twenty-seven changes of spindle rate, the two rate change means being constructed for the twenty-seven changes to be in a geometrical progression of rates whereby a very wide total range may be had, and also constructed for the slowest nine speeds to be transmitted through the large spindle gear 58, the intermediate nine speeds to be transmitted through the intermediate spindle gear 51, and for the fastest nine speeds to be transmitted through the smallest spindle gear 59.

Figure 3:
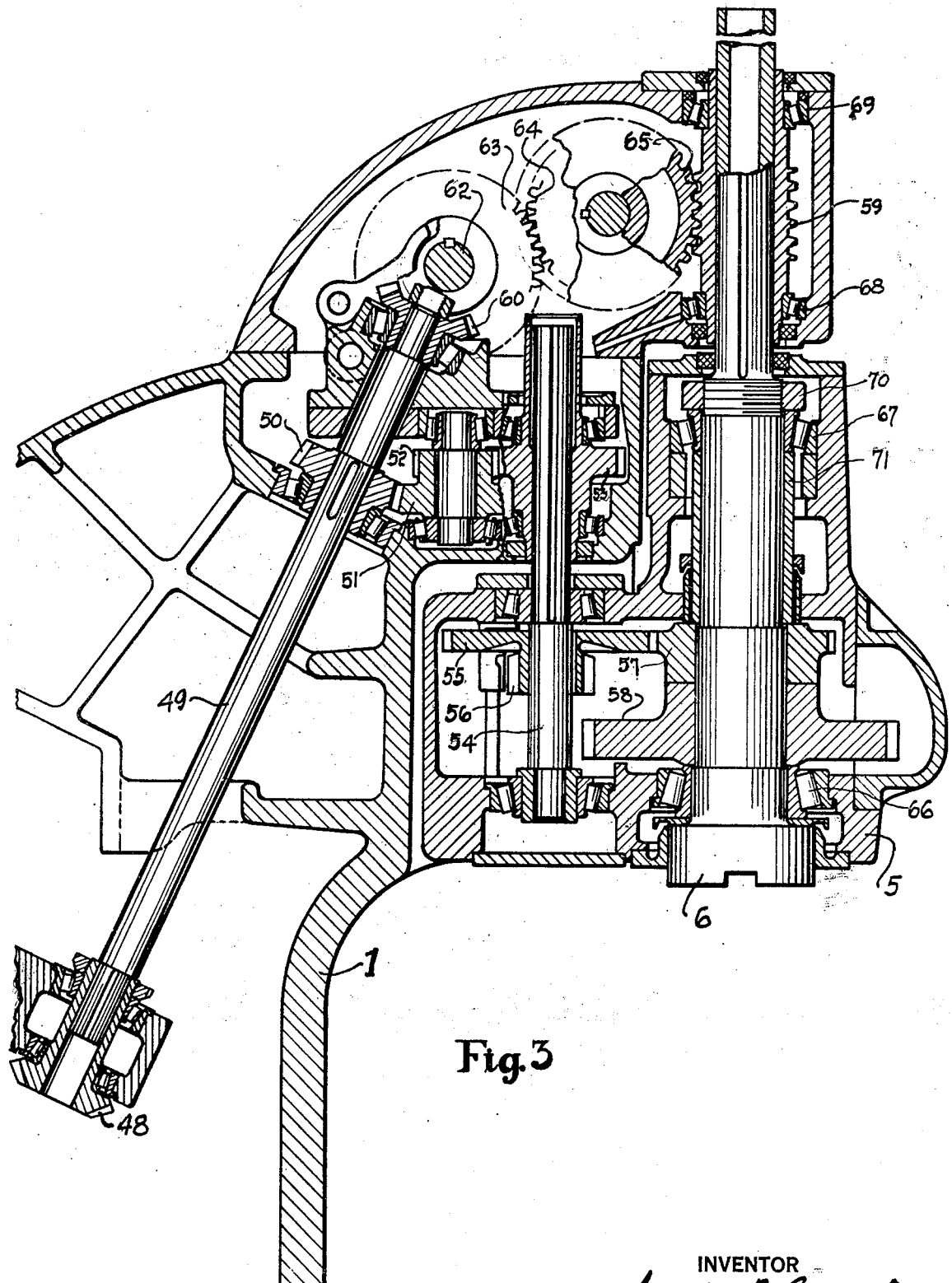
Fig. 3 is a partial section of the upper portion of the spindle train of the same machine, viewed from the left and enlarged.
Figure 4:
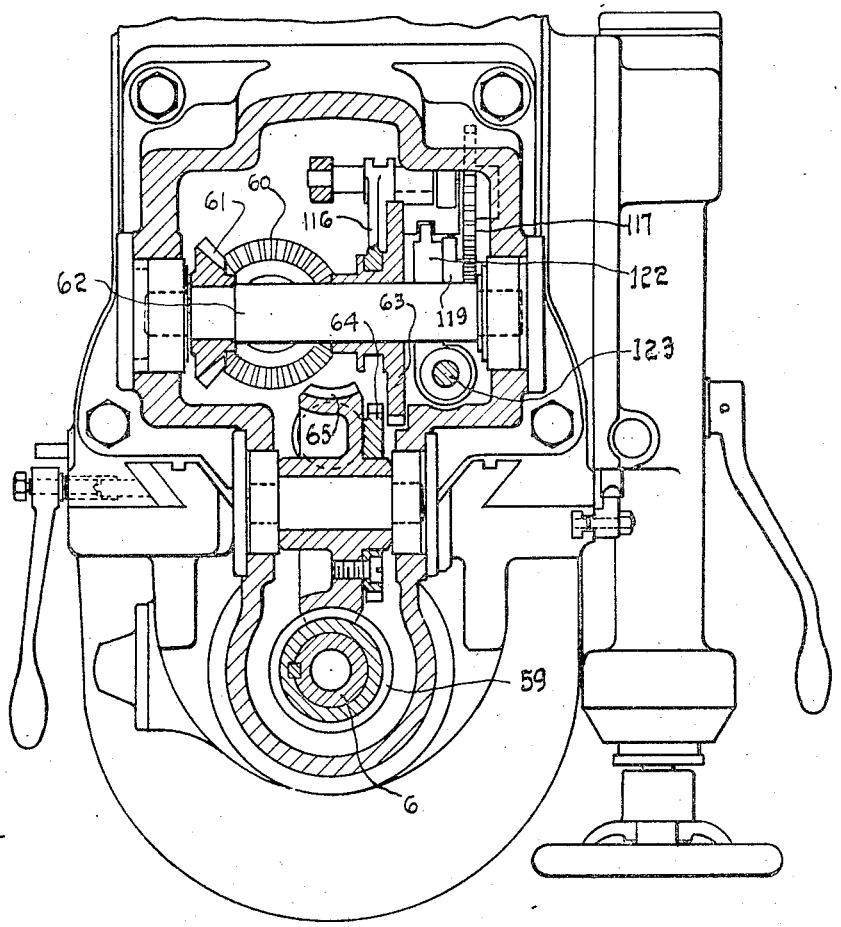
Fig. 4 is a partial top view, partially in horizontal section to show portions of the spindle train, and enlarged.

The vertical spindle 6 is very rigidly supported by an anti-friction bottom bearing 66, Fig. 3, an anti-friction intermediate bearing 67 and a top bearing directly supporting the upper end of the spindle from column 2 and consisting of the two anti-friction bearings 68 and 69, the top end of the spindle being closely but slidably fitted in the bore of the worm 59. The bottom and intermediate bearings 66 and 67 are carried by the spindle carrier 5 and spaced apart axially of the spindle, the gears 58 and 57 being mounted as near to the bottom bearing as possible to avoid tortional strain or distortion which might otherwise be caused by the relatively slow and therefore high torque loads transmitted through these gears. The high speeds through gear 59 being of relatively small torque, these speeds may be transmitted through the length of the spindle without serious distortion. The bearings 66 and 67, in addition to carrying the radial loads, are oppositely disposed to take the thrust of the spindle in either axial direction and of a type such that a single take-up nut 70, threaded on the spindle, will simultaneously adjust both bearings, both for radial and axial loads. Since this adjustment is required only at long intervals, a sleeve 71 opposes the shifting of the inner member or ring of the bearing 67. This sleeve is originally made of the length required for a desired initial loading of the bearings 66, 67 and when bearing adjustment is required, the sleeve is faced off to an extent sufficient to restore the initial bearing load.

The first and second spindle rate change means are both operated from a lever 72, Figs. 2, 5, which carries a spring pressed plunger 73 normally engaging a bore or socket 74 whereby to lock the rate changers in the various positions of adjustment. Plunger 73 may be withdrawn to unlock the rate changers by a handle 75. The lever 72 is fixed on a shaft 76 upon which are fixed gears 77, 78. Gear 77 drives a shifter train for the first rate change means consisting of the gear 77, a gear 80 engaging therewith, a gear 81 fixed on a shaft 82, bevel gears 83, 84, shaft 85, Fig. 5, gear 86 fixed on shaft 85, a gear 87 meshing with gear 86, and a pair of intermittent gears 88, 89, the gear 88 being fixed with gear 87 and driving the gear 89 in a manner such that after each one-third revolution the gear 89 remains stationary while gear 88 completes its revolution. Thus the gear 88 completes three revolutions to one revolution of gear 89 and the gearing between shaft 76 and the gear 88 is such that this movement of the gears 88, 89 corresponds to nine revolutions of shaft 76 and lever 72. Fixed with gear 88 is a pin or shoe 90, Figs. 5, 7, forming an eccentric engaging a suitable slot in a shiftable member 91 which shifts a fork member 92 through the intermediate agency of a spring 93, the fork 92 engaging the sides of gears 32, 33 for movement of the gears 31, 32, 33, the action being such that the eccentric positions gear 32 for engagement when at the high point of its movement, and in two other positions of the eccentric movement, each one-third revolution removed from the high point, the gears 31 and 33 will be engaged respectively, whereby one revolution of the gear 88 successively engages each of the rate change gears 31, 32, 33. Similarly the gear 89 carries a pin or shoe 94, Figs. 5, 8, engaging a suitable slot in a member 95, which shifts a fork member 96 engaging the sides of the gear 24, through the intermediate agency of a spring 97, whereby the eccentric operates in three different positions of one rotation of gear 89 to engage gears 23, 24, 25 respectively.

Thus the intermittent gears 88, 89 and the eccentrics operative therefrom may be, and are, arranged for the gears 31, 32, 33 to be shifted to each of their engaged positions while the gears 23, 24, 25 are held in each of the engaged positions thereof, and a complete rotation of the gear 89, corresponding to three revolutions of gear 88, and nine revolutions of shaft 76 and lever 72 is productive of the entire series of nine speeds of the first rate change means, the gearing being in such relation that in either direction of movement the speeds are arrived at in numerical order and after passing through each of the nine speed positions, a continued movement of shaft 76 and lever 72 in the same direction starts the cycle of nine speeds over again. This will occur in either direction of rotation of the shaft and lever, the only difference being that in the one direction the speeds are arrived at in an ascending order, while in the other direction the order is reversed.

Figure 10:
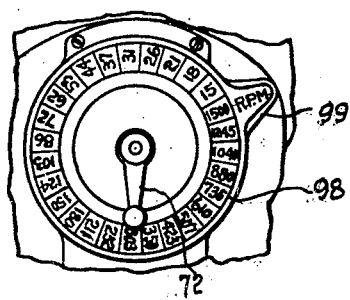

A speed indicating device is associated with the shifting mechanism as follows: A chart or dial 98, Figs. 5, 10, is rotatably supported for movement adjacent an indicator or pointer 99, the chart being geared for movement in accordance with the movement of lever 72, there being a gear 100 fixed with the dial and engaging a gear 101 fixed for rotation with the gear 80 of the shifter train previously described. The dial 98 has a series of indices corresponding to the value and order of the rates obtained by the operation of lever 72. The relation of the gearing of the shifter train and dial is such that the nine revolutions of shaft 76 and lever 72, which effect the nine rate changes of the first rate change means, move the dial through nine indices or one-third of a complete revolution of the dial.

The gear 78 operates shifter trains to the second rate change means, as follows: Gear 78, Fig. 5, engages a gear 102 fixed with a gear 103 which meshes with a gear 104 fixed with a gear 105 meshing with a gear 106 fixed on a shaft 107 upon which also is fixed a bevel gear 108 engaging a gear 109 fixed on a shaft 110 which drives a shaft 111 through bevel gears 112, 113. The engaged gears 103, 104 are intermittent gears of such form that, after each one-third revolution of gear 104, it remains stationary while gear 103 completes its revolution. Similarly the gear pair 105, 106 is intermittent gears of such form that after each one-third revolution of gear 106 it remains stationary while gear 105 completes its revolution. The effect of the two pairs of intermittent gears, together with the other gearing, is to hold the shaft 111 stationary, while the first rate change means is being shifted through its entire series of nine speeds, following which the continued movement of lever 72 and shaft 76 rotates the shaft 111 one-third revolution during the time that the first rate change means is being moved to the position in which the first speed of the repeated series is effected. Thus, while shaft 111 is completing a single revolution, the first rate change means is shifted three times through its series of nine speed positions. Shaft 111 has fixed thereon a cam 114, Figs. 2, 5, having a groove engaging a pin or follower 115 fixed with a fork member 116, Figs. 2, 4, which engages an annular groove in the hub of the gear 63 for shifting the gear into and out of engagement with the gear 64. Fixed with shaft 111 is an intermittent gear 117, Figs 5, 9, engaging an intermittent gear 118 fixed with a member 119 carrying a pin or shoe 120 forming an eccentric engaging an arcuate slot 121 in a member 122 held between shoulders on an axially shiftable and rotatable rod 123 threadedly engaging a co-axial rod 124 which is prevented from rotating and carries a fork member 125 engaging the sides of the gear 55 for engaging and disengaging the gears 55, 56.

The cam member 115, the intermittent gears 117, 118 and the eccentric 120 are of such form and relationship that, during a one-third revolution of shaft 111, the gear 63 is engaged and disengaged while gears 55, 56 are held in disengaged position, and during the next succeeding two-thirds revolution of shaft 111, first the one and then the other of the gears 55, 56 is engaged while gear 63 is held in disengaged position. Moreover, the order of the engagement of the gears is such that in either direction of rotation of shaft 111 the three rates available from the several gears of the second rate change means are arrived at in numerical order, and by reason of the twenty-seven positions of the first rate change means which occur during a complete revolution of shaft 111, the speeds effected on spindle 6 form a series of twenty-seven speeds arrived at in numerical order either ascending or descending according to the direction of rotation of lever 72 and shaft 76, the twenty-seven speed positions corresponding to the twenty-seven numerical indices on the dial 98, Fig. 10, whereby in any position of the rate changer the dial indicates the spindle speed then available.

The purpose of the arcuate form of the slot 121 of member 122 is to provide for an equal rotative movement of the member 119 to effect engagement and disengagement of the gears 55, 56 in spite of the different axial width of the gears. By reason of the arcuate slot form a quarter turn of the eccentric member 119 in either direction from the position of Fig. 5 will move gears 55, 56 to disengaged position. From the position then existent a quarter turn in the one direction will engage gear 55 and a quarter turn in the other direction will engage gear 56, the arcuate slot adding to the otherwise resulting movement of the member 122 in the one direction of movement thereof, and subtracting in the other direction.

The purpose of the rotatably threaded engagement of the shifter elements 123 and 124 is to automatically compensate for the vertical movement of gear pair 55, 56 with respect to the shifting mechanism in the column. To effect automatic compensation the threads of elements 123, 124 are of the same lead or pitch as are those of a rotatable screw 126, Fig. 5, which effects the vertical movement of carrier 16, screw 219 being journaled in the column and engaged with a nut, not shown, fixed with the carrier, and being geared to rotate the member 123 by the means of the gears 127, 128, the gear 128 being elongated to maintain the meshed connection in any position of the shifting movement of member 122. It is apparent that a variety of other connections could be used to compensate in the shifter train for bodily movement of the gears to be shifted, the essential requirement being that the compensation effected should be in strict accordance with the movement of the carrier and gears, whereby the bodily shifting with the carrier will not operate to shift the rate change gears out of the position selected by the rate change control means.

Having now explained my invention, what is claimed is:

1. In a milling machine having relatively bodily movable supports, the combination of a transmission mechanism including a rate changer providing serially arranged gearing shiftable to a variety of position combinations collectively productive of a high rate, a relatively low rate and a variety of intermediate rates, different shiftable portions of said gearing being arranged in different of said supports for relative bodily movement with the supports, a gear shift lever carried on one of said supports, and motion transmitting connections from said lever to each of said shiftable portions, one of said connections including means adapted automatically to compensate said connection in accordance with said relative bodily movement whereby to maintain a position of said shiftable portions selected by said lever in spite of said bodily movement.

2. A milling machine as specified in claim 1 in which threaded screw means is provided for said relative bodily movement, and in which said compensating means is connected to be operative in accordance with the actuation of said screw means.

3. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a spindle rate changer including a shiftable rate change portion housed within said hollow carrier and another shiftable rate change portion housed within said hollow column, control means for said rate changer including a chart, indicating means movable relative thereto to positions indicating the rates effected by the different positions of said shiftable portions and means including motion transmitting connections to effect simultaneous corresponding positions of said indicating means and shiftable portions.

4. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a plurality of spindle bearings in said carrier and spaced apart along the spindle axis, a transmission for rotation of said spindle including a driven gear fixed with said spindle between said bearings, and another bearing supporting said spindle directly from said column and positioned above the first mentioned bearings.

5. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a plurality of spindle bearings in said carrier and spaced apart along the spindle axis, a transmission for rotation of said spindle including a rate changer, a pair of gears each in driving engagement with said spindle between said bearings, a third bearing supporting said spindle directly from said column and positioned above the first mentioned bearings, a third gear in driving engagement with said spindle adjacent said third bearing, and rate change control means adapted to connect said rate changer with said spindle alternatively through the one or the other of said pair of gears or through said third gear.

6. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a plurality of spindle bearings in said carrier and spaced apart along the spindle axis, a transmission for rotation of said spindle including a rate changer, a pair of different diametered spur gears each fixed with said spindle between said bearings and spaced apart for the larger diametered gear to be adjacent the lower bearing, a third bearing supporting said spindle directly from said column and positioned above the first mentioned bearings, a worm in driving engagement with said spindle adjacent said third bearing and rate change control means adapted to connect said rate changer with said spindle selectively through the one or the other of said spur gears or through said worm gear.

7. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a spindle rate changer including a shiftable rate change portion housed within said hollow carrier and another shiftable rate change portion housed within said hollow column, control means for said rate changer including shifting means providing a member movable to control the position of elements in each of said rate change portions and connections through said member to each of said portions, one of said connections providing means preventing the relative bodily movement of the column and carrier from disturbing the rate change adjustment determined by said member, and indicating means associated with said member and movable in accordance therewith to indicate the rate effected by the element positions controlled therefrom.

8. In a milling machine, the combination of an upstanding hollow column, a table supported therefrom for horizontal reciprocatory movement, an axially vertical rotatable tool spindle supported from said column above said table, a hollow carrier for said spindle and slidably guided on said column for bodily vertical movement together with said spindle, a plurality of spindle bearings in said carrier and spaced apart along the spindle axis, a transmission for rotation of said spindle including a driven gear fixed with said spindle between said bearings, and another bearing supporting said spindle directly from said column and positioned above the first mentioned bearings, said spaced apart bearings including thrust elements for fixing the axial position of said spindle with respect to said carrier.

9. In a milling machine having relatively bodily movable supports, the combination of a transmission mechanism including a rate changer providing serially arranged gearing shiftable to a variety of position combinations collectively productive of a high rate, a relatively low rate and a variety of intermediate rates, different shiftable portions of said gearing being arranged in different of said supports for relative bodily movement with the supports, shifting means for said gearing providing a member movable to control the position of gearing in each of said portions, and connections through said member to each of said portions, one of said connections providing means preventing the relative movement of said supports from disturbing the rate change adjustment determined by said member, and indicating means associated with said member and movable in accordance therewith to indicate the rate effected by the gear positions controlled therefrom.

JOSEPH B. ARMITAGE.